(12) United States Patent
Hwang et al.

(10) Patent No.: US 7,849,179 B2
(45) Date of Patent: *Dec. 7, 2010

(54) SYSTEM AND PROGRAM FOR MANAGING DEVICES IN A NETWORK

(75) Inventors: Hai-Yann Hwang, San Jose, CA (US); Karsten Jancke, Frankfurt (DE); Thorsten Schaefer, Mainz (DE); Sergio P. Bonilla, San Jose, CA (US); Xin Wang, San Jose, CA (US); Cindy Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/111,116

(22) Filed: Apr. 28, 2008

(65) Prior Publication Data

US 2008/0228909 A1 Sep. 18, 2008

Related U.S. Application Data

(63) Continuation of application No. 10/371,336, filed on Feb. 20, 2003, now Pat. No. 7,386,609.

(51) Int. Cl.
*G06F 15/173* (2006.01)
(52) U.S. Cl. .................. 709/223; 709/224; 709/225; 709/226
(58) Field of Classification Search ........... 709/223, 709/224, 225, 226
See application file for complete search history.

(56) References Cited

U.S. PATENT DOCUMENTS 4,855,905 A 8/1989 Estrada et al.

(Continued)

FOREIGN PATENT DOCUMENTS

EP 1061441 A2 12/2000

(Continued)

OTHER PUBLICATIONS

"Common Information Model (CIM) Core Model", Status Final, Version 2.4, Aug. 30, 2000, pp. 1-54).*

(Continued)

*Primary Examiner*—Vivek Srivastava
*Assistant Examiner*—William J Goodchild
(74) *Attorney, Agent, or Firm*—David W. Victor; Konrad Raynes and Victor LLP

(57) ABSTRACT

Provided are a system, and program for managing devices in a network. A command of a first type to perform device management operations with respect to at least one device in the network is received, wherein the received command is capable of being directed to at least one of a plurality of devices in the network. A determination is made from a first mapping of a network address of the device to which the received command is directed. A determination is made from a second mapping of at least one command of a second type associated with the received command of the first type, wherein the mapping indicates a mapping of at least one parameter included in the received command of the first type to at least one parameter in the associated command of the second type. The determined command of the second type is generated to include as parameters the at least one parameter from the command of the first type indicated in the second mapping and the generated command of the second type is transmitted to the determined network address.

30 Claims, 6 Drawing Sheets

U.S. PATENT DOCUMENTS

| | | |
|---|---|---|
| 5,560,013 A | 9/1996 | Scalzi et al. |
| 5,809,028 A | 9/1998 | Nethercott et al. |
| 5,961,582 A | 10/1999 | Gaines |
| 6,021,484 A | 2/2000 | Park |
| 6,065,040 A | 5/2000 | Mima et al. |
| 6,085,198 A | 7/2000 | Skinner et al. |
| 6,122,691 A | 9/2000 | Arimilli et al. |
| 6,131,121 A | 10/2000 | Mattaway et al. |
| 6,145,014 A | 11/2000 | Chong |
| 6,226,649 B1 | 5/2001 | Bodamer et al. |
| 6,317,748 B1 | 11/2001 | Menzies et al. |
| 6,327,594 B1 | 12/2001 | Van Huben et al. |
| 6,327,627 B1 | 12/2001 | Orton et al. |
| 6,370,592 B1 | 4/2002 | Kumpf |
| 6,389,129 B1 | 5/2002 | Cowan |
| 6,470,354 B1 | 10/2002 | Aldridge et al. |
| 6,480,955 B1 | 11/2002 | DeKoning et al. |
| 6,484,177 B1 | 11/2002 | Van Huben et al. |
| 6,493,719 B1 | 12/2002 | Booth et al. |
| 6,711,617 B1 | 3/2004 | Bantz et al. |
| 6,772,413 B2 | 8/2004 | Kuznetsov |
| 7,062,551 B2 | 6/2006 | Sedlack |
| 7,085,839 B1 * | 8/2006 | Baugher et al. ............ 709/229 |
| 7,587,421 B2 | 9/2009 | Bonilla et al. |
| 2002/0107872 A1 | 8/2002 | Hudis et al. |
| 2002/0108102 A1 | 8/2002 | Muhlestein et al. |
| 2002/0112038 A1 | 8/2002 | Hessmer et al. |
| 2002/0199022 A1 | 12/2002 | Tsang et al. |
| 2003/0055862 A1 | 3/2003 | Bhat |
| 2003/0055948 A1 * | 3/2003 | Wang ........................ 709/224 |
| 2004/0024483 A1 | 2/2004 | Holcombe |
| 2004/0039745 A1 | 2/2004 | Evans et al. |
| 2004/0088347 A1 | 5/2004 | Yeager et al. |
| 2004/0133640 A1 | 7/2004 | Yeager et al. |
| 2005/0172258 A1 | 8/2005 | Nixon et al. |

FOREIGN PATENT DOCUMENTS

| | | |
|---|---|---|
| EP | 1061445 A2 | 12/2000 |
| GB | 2330671 A | 4/1999 |
| GB | 2368684 A | 8/2002 |
| JP | 2001084324 | 7/2001 |
| JP | 2002157172 | 5/2002 |
| KR | 2001053760 | 7/2001 |
| TW | 484066 | 4/2002 |
| TW | 485731 | 5/2002 |
| TW | 505865 | 10/2002 |

OTHER PUBLICATIONS

IBM Corp., "Method and System for Dynamically Associating Multiple Globally Unique Identifiers with a Software Application's Managed Set of Objects using a Common Registry", Research Disclosure No. 436166, Aug. 2000, pp. 1475.

C. Calvert, "Delphi 4 Unleashed, Chapter 3, Polymorphism", XP002330120, Sams Publishing, Nov. 1998.

PCT International Search Report & Written Opinion for application No. PCT/EP2005/050041, filed Jun. 1, 2005.

Distributed Management Task Force, Inc. "Common Information Model (CIM) Core Model", Status: Final, Version 24, Aug. 30, 2000, pp. 1-54.

Distributed Management Task Force, Inc. "Device Storage Model White Paper", Status : Preliminary, Version 0.3, 2000-2002 DMTF. pp. 1-37.

Distributed Management Task Force, Inc. "Specifications for CIM Operations over HTTP", Status :Preliminary, Version 1.1, May 2, 2002, pp. 1-88.

Gentry, JR. et al. "Generic Code Page Conversion Application Program Interface", IBM Technical Disclosure Bulletin, vol. 34, No. 12, May 1992, pp. 421-430.

* cited by examiner

Device Mapping Entry

SYSTEM AND PROGRAM FOR MANAGING DEVICES IN A NETWORK

CROSS-REFERENCE TO RELATED APPLICATIONS

This application is a continuation of U.S. patent application Ser. No. 10/371,336, filed on Feb. 20, 2003, which application is incorporated herein by reference in its entirety.

BACKGROUND OF THE INVENTION

1. Field of the Invention

The present invention relates to a system and program for managing devices in a network.

2. Description of the Related Art

The Common Information Model (CIM) is an industry standard specification to allow for the interchange of management information in a network environment including devices from different vendors, where the network may include heterogenous as well as homogeneous devices. The CIM schema specifies a set of classes, including methods and objects, that management programs call to obtain information and perform management operations with respect to devices in the network. Each vendor of a network device that is capable of interfacing in a CIM environment must provide a set of device specific APIs that implement the CIM classes. A vendor would provide a CIM Provider, which is a program module that maps CIM APIs or methods, as defined by the industry standard CIM model, to device specific APIs that may implement the functionality of a defined CIM API for the specific device. The term "CIM API" as used herein refers to any method, interface or function that is called to perform an operation defined within the CIM management schema.

There is a continued need in the art to provide device vendors improved techniques to develop CIM providers that provide the device specific APIs to implement CIM APIs to allow their devices to participate in a CIM network environment and interface with management applications issuing management related requests as CIM APIs.

SUMMARY OF THE DESCRIBED IMPLEMENTATIONS

Provided are a method, system, and program for managing devices in a network. A command of a first type to perform device management operations with respect to at least one device in the network is received, wherein the received command is capable of being directed to at least one of a plurality of devices in the network. A determination is made from a first mapping of a network address of the device to which the received command is directed. A determination is made from a second mapping of at least one command of a second type associated with the received command of the first type, wherein the mapping indicates a mapping of at least one parameter included in the received command of the first type to at least one parameter in the associated command of the second type. The determined command of the second type is generated to include as parameters the at least one parameter from the command of the first type indicated in the second mapping and the generated command of the second type is transmitted to the determined network address.

In further implementations, the first type of command comprises a device independent command and the second type of command comprises a device dependent command.

In still further implementations, the device independent command comprises a command that is part of an object oriented management schema for managing non-homogeneous devices in a network environment, such as the Common Information Model (CIM).

Yet further, output related to the transmitted device specific command is received, wherein the transmitted device specific command comprises a previously executed command. A determination is made as to whether the second mapping indicates an additional device specific command associated with the received device independent command that follows the previously executed command. The additional device specific command is generated to the determined network address if the second mapping indicates the additional device specific command.

In yet further implementations, wherein generating the additional device specific command further comprises determining from the second mapping a mapping of the received output to at least one parameter of the additional device specific command, wherein at least one parameter included in the generated additional device specific command includes the received output that maps to the at least one parameter of the previously executed command.

Described implementations provide techniques for translating a command in a first format type, such as a device independent command, to one or more commands in a second format type, such as a device dependent command, so that the command in the second format type is transmitted to a device to execute.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
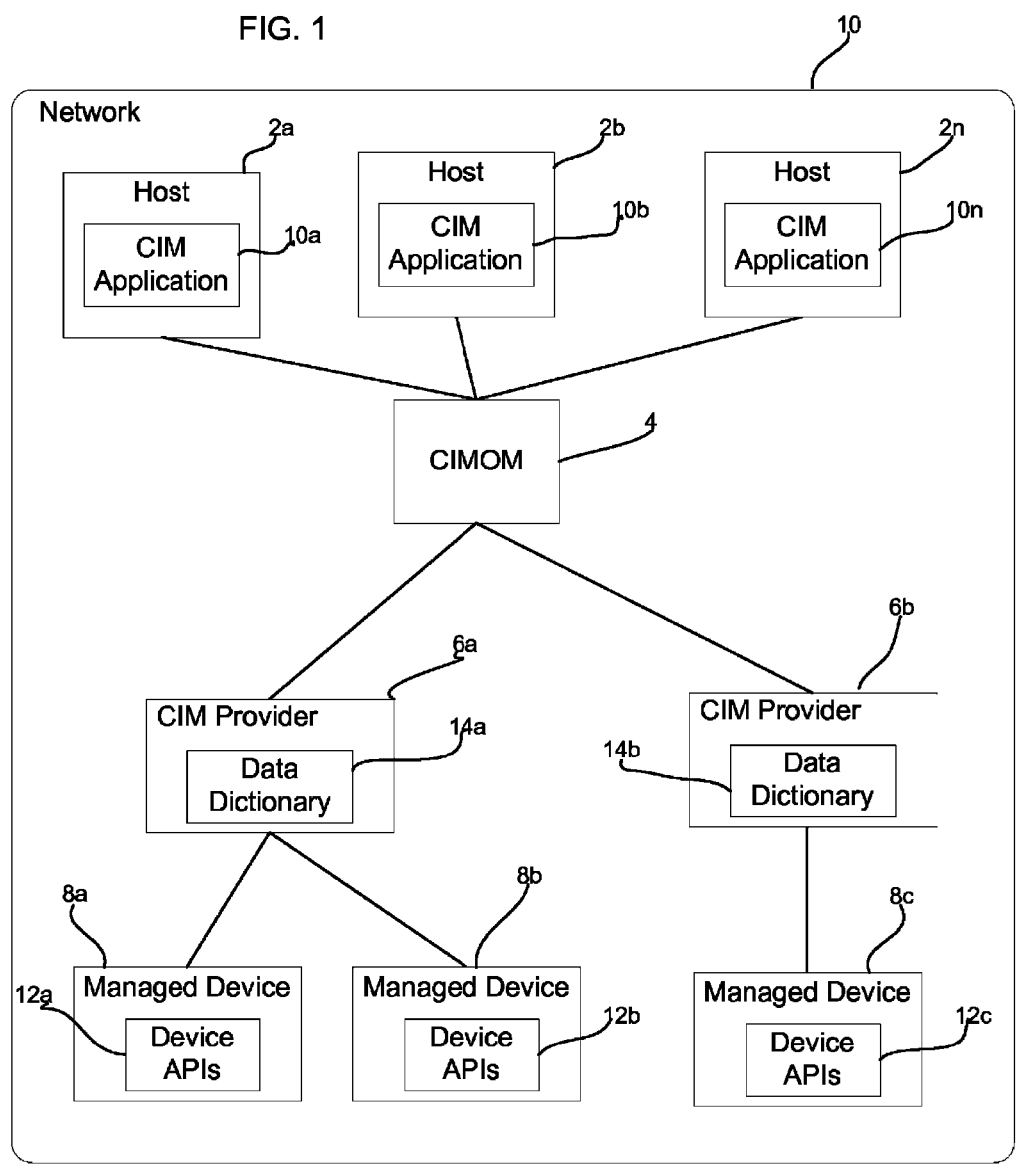
FIG. 1 illustrates a computing environment in which aspects of the invention are implemented.

FIG. 1 illustrates a computing architecture in which aspects of the invention are implemented. A plurality of host systems 2a, 2b . . . 2n, a CIM Object Manager (CIMOM) 4, CIM providers 6a, 6b, and managed devices 8a, 8b, 8c communicate over a network 10. Each host 2a, 2b . . . 2n includes a CIM application 10a, 10b . . . 10n to generate and communicate CIM management requests comprised of CIM APIs to perform management operations with respect to the managed devices 8a, 8b, 8c. The CIMOM 4 receives CIM requests from the CIM applications 10a, 10b . . . 10n and transfers them to the CIM provider 6a, 6b associated with the managed device 8a, 8b, 8c to which the request is directed. Each managed device 8a, 8b . . . 8n implements device specific APIs 12a, 12b . . . 12n, which perform management related operations, retrieving information, configuration, etc., on the device 8a, 8b . . . 8bn. The CIM provider 6a, 6b includes data dictionaries 14a, 14b that are used to map CIM commands in CIM messages to device specific APIs 12a, 12b . . . 12n capable of implementing the CIM command on the target managed device 8a, 8b . . . 8n. Further details of the CIM model are described in publications from the Distributed Management Task Force (DMTF), including "Common Information Model (CIM) Specification", Version 2.2, (Jul. 14, 1999), "Understanding the Application Management Model", Version 1.0 (May 17, 1998), and "Common Information Model Core Model", Version 2.4 (Aug. 30, 2000), which publications are incorporated herein by reference in their entirety.

The network 10 may comprise any network known in the art, such as a Local Area Network (LAN), Storage Area Network (SAN), Wide Area Network (WAN), the Internet, a wireless network, etc. Alternatively, the network 10 may comprise a bus interface. The hosts 2a, 2b . . . 2n may comprise any type of computational device capable of running a CIM application 10a, 10b . . . 10n, such as a workstation, desktop computer, server, laptop, mainframe, telephony device, hand held computer, etc. The CIMOM 4 may be implemented in a system separate from the hosts 2a, 2b . . . 2n. The CIM providers 6a, 6b . . . 6n may run on systems separate from the CIMOM or run within the managed devices 8a, 8b, 8c. Further, one CIM provider 6a, 6b . . . 6n may manage CIM messages for one or more managed devices 8a, 8b . . . 8n. The managed device 8a, 8b . . . 8n may comprise any physical or logical device known in the art, such as a storage device, storage medium, storage media library, Fibre Channel, switch, fabric, database, etc., for which a separate CIM provider may be provided. There may be any number of hosts, CIMOMs, CIM providers, and managed devices and relations therebetween in the network, and the implementation is not limited to the configuration and arrangement of components shown in FIG. 1.

The CIM applications 10a, 10b . . . 10n may generate CIM messages including one or more CIM APIs in a manner known in the art, such as described in the publication "Specification for CIM Operations Over HTTP" (Copyright Distributed Management Task Force, Jan. 6, 2003). For instance, the CIM messages may comprise an Extensible Markup Language (XML) file including CIM APIs. The CIM APIs included in a CIM message would further include a target device name or other identifier of the managed device 8a, 8b . . . 8n to which the CIM API command is directed.

Figure 2:
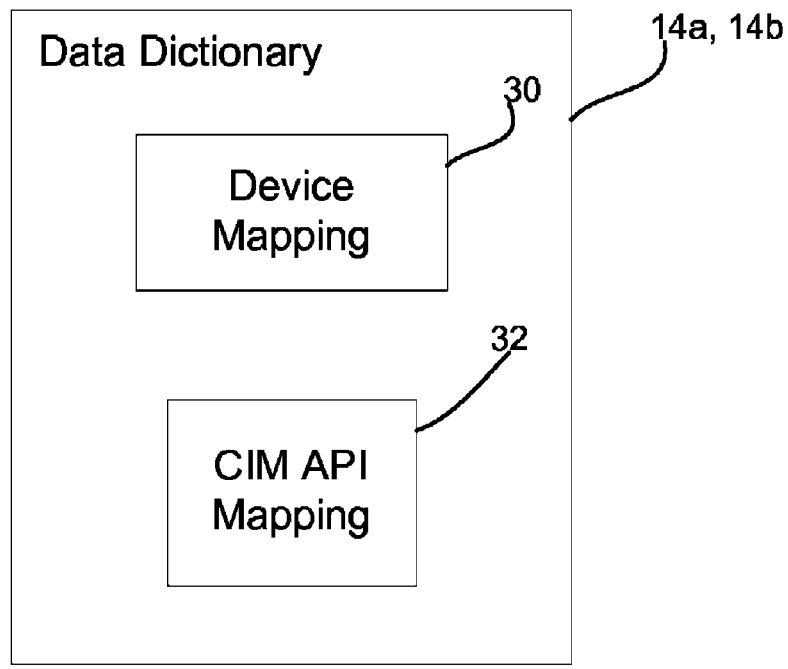
FIG. 2 illustrates components of a data dictionary in accordance with implementations of the invention.
Figure 3:
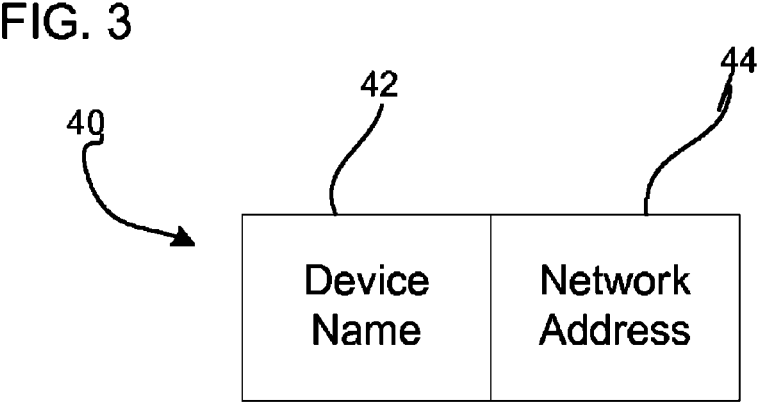
FIG. 3 illustrates information used to associate a target device name with a network address in accordance with implementations of the invention.

FIG. 2 illustrates an implementation of the data dictionary 14a, 14b as including two components, a device mapping 30 and a CIM API mapping 32. The device mapping 30 would include an entry for each managed device 8a, 8b for which the CIM provider 6a, 6b translates CIM APIs. FIG. 3 illustrates an example of the information that may be included in a device mapping entry 40 in the device mapping 30, including the device name 42 or identifier of the managed device 8a, 8b, 8c that would be included as a parameter in the CIM message and the network address 44 of the managed device 8a, 8b, 8c associated with the device indicated in the CIM message. The CIM provider 6a, 6b would use the device mapping 30 to determine the network address 44 of the target managed device 8a, 8b, 8c to which the CIM message is directed.

Figure 4:
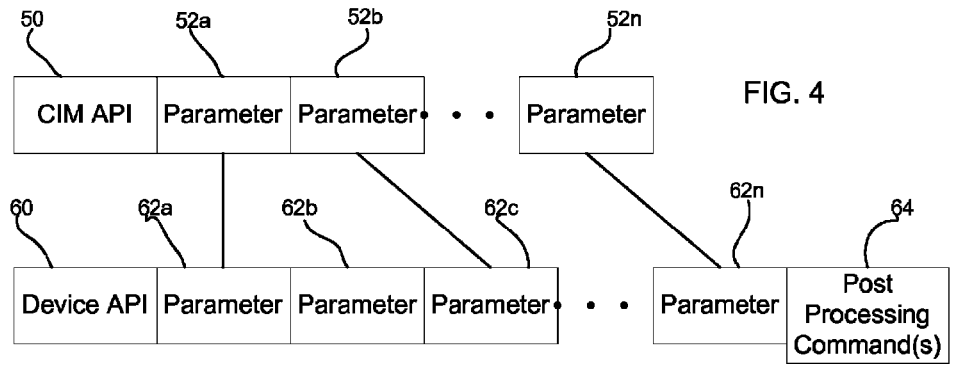
FIGS. 4, 5, and 7 illustrate information on a mapping of a device independent command to one or more device specific commands in accordance with implementations of the invention.

The CMI API mapping 32 provides an entry for each CIM API implemented by the device APIs 12a, 12b, 12c. Each entry in the mapping 32 provides a mapping of a CIM API to one or more device APIs that implement the CIM API. FIG. 4 illustrates an entry in the CIM API mapping 32 where a CIM API 50 with one or more parameters 52a, 52b . . . 52n maps to a single device specific API 60 having device parameters 62a, 62b, 62c . . . 62n. The mapping further indicates how one or more of the parameters 52a, 52b . . . 52n of the CIM API 50 map to parameter fields 62a, 62b . . . 62n in the device API 60. The CIM API 50 and device API 60 may have a different number of parameters, and any number (one or more) of CIM API parameters 52a, 52b . . . 52n can map to the device API parameters 62a, 62b . . . 62n. Not all the CIM API 50 parameters may map to device API 60 parameters and, additionally, the CIM API 50 parameters may map to fewer than all of the device API parameters 60. In other words there may be any mapping (many-to-many) of CIM to device API parameters.

The device APT 60 portion of the entry further includes a post processing command field 64 that indicates nothing or one or more functions to perform filtering or other postprocessing operations on any output data returned by the execution of the device API 60 on the managed device 8a, 8b, 8c to transform the output before returning the output to the CIM application 10a, 10b . . . 10n initiating the CIM message. The post processing operation initiated by executing the operation specified in field 64 may change the format of the data or perform any other type of filtering or post-processing of data known in the art.

Figure 5:
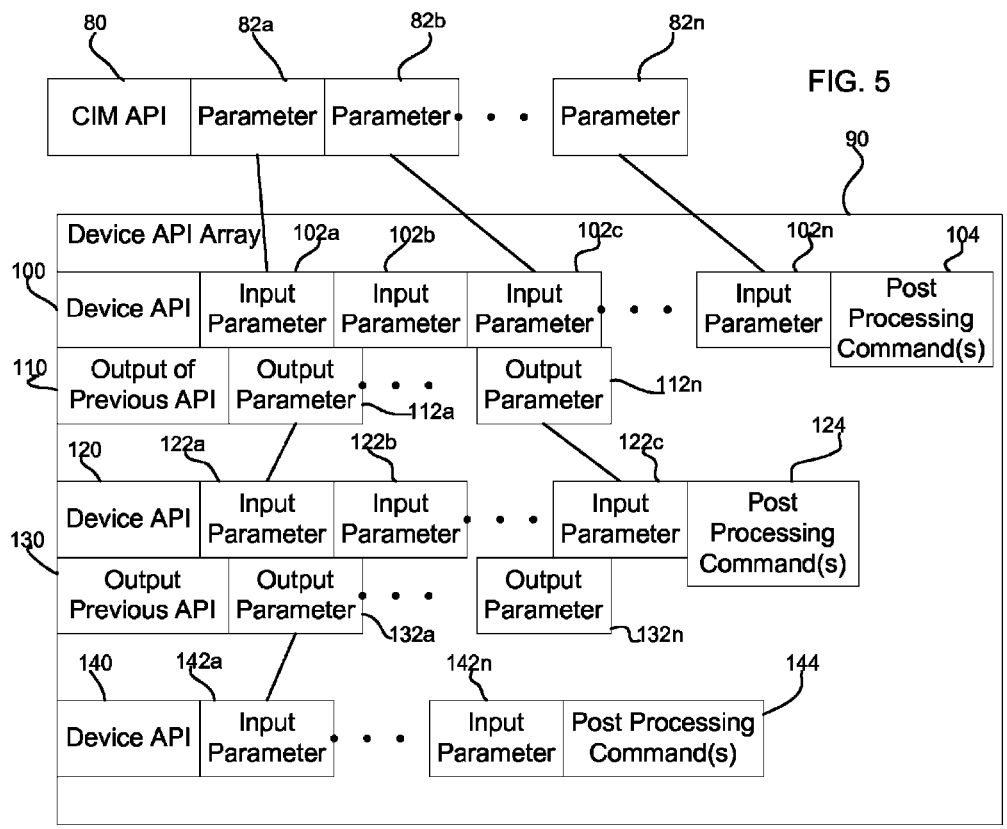

An entry in the CIM API mapping 32 may further identify a CIM API as mapping to an array of device specific APIs, which are sequentially executed to implement the CIM API. FIG. 5 illustrates an example of a mapping of a CIM API 80 having parameters 82a, 82b . . . 82n that maps to a device API array 90 of a plurality of device APIs 100, 120, and 140. The device API array 90 may specify a sequence of device APIs, such that following the first device API, the output of one executed device API provides input to the next device API in the array to execute. This sequence is used when one device API needs output from another device API, such as information on available storage, media, logical devices, etc. For instance, the CIM API 80 and parameters 82a, 82b . . . 82n map to a first device API 100 and input parameters 102a, 102b . . . 102n. The device API array 90 further indicates how any output 110 parameters 112a . . . 12n of executing the first device API 100 map to input parameters 122a, 122b of a second device API 120. Likewise, any output 130 parameters 132a . . . 132n of executing the second device API 120 map to one or more input parameters 142a . . . 142n of a further device API 140. In this way, a series of device specific APIs are executed to implement the corresponding CIM API 80.

The device APIs 100, 120, and 140 indicated in the device API array 90 may (or may not) indicate in the post-processing field 104, 124, and 144 whether to perform post-processing of the output data before passing the output data to the input parameters of the next device API in the array 90 or back to the CIM application 10a, 10b . . . 10n if the device API 140 is the last in the device API array 90. Additionally, the post processing operation may check output from the executed command with in order to determine whether control proceeds to any further device APIs in the array 90 or control ends. With the device array mapping, any number of the CIM parameters may map to any number of the device API parameters 102a, 102b . . . 102n in the first device API 100 in the array 90, such that not all of the CIM parameters need map to device API parameters, and vice versa. Further, any number of the one or more output parameters from one device API, whether or not post-processed, may map to any number of one or more of the input parameters in subsequent device APIs in the array 90 to execute. In FIG. 5, the parameters used for the second or further device APIs 120, 140 come from the output of the previously executed device API. In further implementations, the CIM parameters 82*a*, 82*b* . . . 82*n* or any input or output parameters from any previously executed device API may map to the input parameters of any of the device APIs in the array.

When coding a CIM provider, a device vendor would populate the CIM API mapping 32 with entries to map CIM APIs to one or more device APIs that implement the CIM APIs. A network administrator may use program methods to populate the namesopace mapping 30 to associate a device name or identifier included in a CIM message with a specific device in the network.

Figure 6:
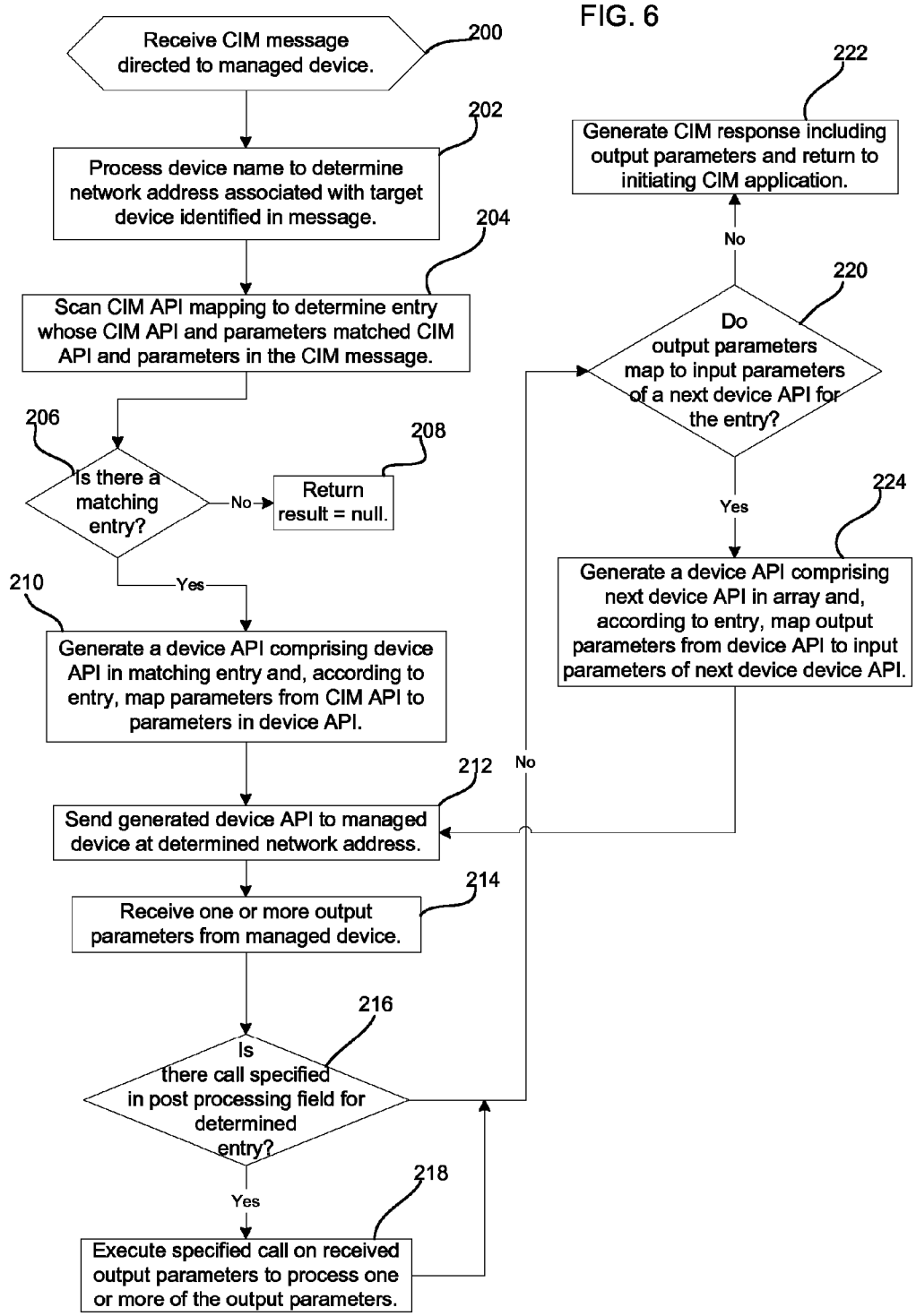
FIG. 6 illustrates logic to map device independent commands to device specific commands in accordance with implementations of the invention.

FIG. 6 illustrates logic implemented in the CIM provider 6*a*, 6*b* code to use the data dictionary 14*a*, 14*b* to process CIM messages routed by the CIMOM 4 from a CIM application 10*a*, 10*b* . . . 10*n* to the receiving CIM provider 6*a*, 6*b*. As discussed, the CIM message may conform to CIM messages known in the art, where a CIM API is followed with various parameters for the API and an identifier of the target managed device 8*a*, 8*b* . . . 8*n*, such as a device name. Upon receiving (at block 200) a CIM message directed to a managed device 8*a*, 8*b* associated with the receiving CIM provider 6*a*, 6*b*, the CIM provider 6*a*, 6*b* process (at block 202) the device mapping 30 to determine a network address 44 (FIG. 3) associated with a device name 42, or other identifier of the target device included in the received CIM message. The CIM message may contain one or more CIM APIs to process. The logic of FIG. 6 would be performed for each CIM API in the message. The CIM provider 6*a*, 6*b* scans (at block 204) the CIM API 32 mapping to determine an entry whose CMI API and parameters match CIM API and parameters in the received CIM message. If (at block 206) there is no matching entry, then a message is returned (at block 208) to the CIM provider 10*a*, 10*b* . . . 10*n* initiating the CIM message that the requested CIM API is not supported. Otherwise, if an entry in the CIM API mapping 32 is found, such as shown in FIGS. 4 and 5, then the CIM provider 6*a*, 6*b* generates (at block 210) a device API comprising the device API in the matching entry and, according to the information in the entry, maps parameters from the CIM API to parameters in the device API in the entry. The CIM provider 6*a*, 6*b* then sends (at block 212) the generated device API to the managed device 8*a*, 8*b*, 8*c* at the determined network address 44.

In the case where there is a one-to-one mapping of the CIM API 50 to one device API 80 (FIG. 4), then one or more of the CIM API 50 parameters 52*a*, 52*b* . . . 52*n* map to one or more of the device API 60 parameters 62*a*, 62*b* . . . 62*n*. In the case where one CIM API 80 maps to multiple device APIs 100, 120, 140 in a device API array 90 in the entry (FIG. 5), then one or more of the CIM API 80 parameters 82*a*, 82*b* . . . 82*n* map to one or more of the device API 100 parameters 110*a*, 110*b* . . . 110*n* of the first device API 100 in the array 90.

Upon receiving (at block 214) one or more output parameters from the managed device 8*a*, 8*b*, 8*c* in response to processing the transmitted device API, if (at block 216) there is a call specified in the post-processing field 64, 104 for the determined entry in the CIM API mapping 32, then the CIM provider 6*a*, 6*b* executes (at block 218) the specified call on the received output parameters to process and transform one or more of the output parameters to transformed output. If the output parameters are not transformed (from the no branch of block 216) or after they are transformed (block 218), then a determination is made (at block 220) as to whether the output parameters map to input parameters of a next device API. There are no next device APIs to process for the entry if, as in the case of FIG. 4, there is only one device API 60 provided to implement the CIM API 50 or if, as in the case of FIG. 5, the output is returned in response to the execution of the last device API 140 in the device API array 90. On the other hand, the output parameters (or transformed output parameters) would map to the input parameters of a next device API, if there are one or more device APIs 120, 140 in the device API array 90 following the just executed device API 100, 120 in the array 90.

If, as determined at block 220, the received output parameters do not map to a next device API, then the CIM Provider 6*a*, 6*b* generates (at block 222) a CIM response including the received output parameters, which may or may not have been post-processed, and returns the CIM response to the initiating CIM application 10*a*, 10*b* . . . 10*n*. If the received output 110, 130 of the previously executed device API parameters maps to a subsequent device API 120, 140, then the CIM provider 6*a*, 6*b* generates (at block 224) a device API comprising the next device API 120, 140 in the device API array 90 and, according to the mapping indicated in the array 90, maps one or more of the received output parameters 112*a* . . . 112*n* or 132*a* . . . 132*n* to one or more input parameters 122*a*, 122*b* . . . 122*n* or 142*a*, 142*b* . . . 142*n* of the next device API 120, 140 to process in the device API array 90.

In the above described implementations, a CIM request was directed to a single target device. In additional implementations, the CIM application 10*a*, 10*b* . . . 10*n* may direct a CIM request to multiple target devices. In certain implementations, the CIM application 10*a*, 10*b* . . . 10*n* may designate multiple target devices by including no specific device identifier with the request, where the device mapping 30 would map the absence of a target device identifier in the CIM request to all target devices 8*a*, 8*b*, 8*c* managed by the CIM provider 6*a*, 6*b* receiving the request. The CIM provider would perform the steps at blocks 210 through 224 in FIG. 6 for each of the multiple target devices 8*a*, 8*b*, 8*c* to which the request is directed.

In the above described implementations, the post-processing operation processes output parameters that are provided as input to a subsequent device API 120, 140 or as output returned to the CIM response. In additional implementations, the post processing may perform additional operations, such as process output from one device API 100, 120 in the device API array 90 to determine, based on the output, whether to execute one or more subsequent device APIs in the device API array 90. FIG. 6 illustrates a mapping of a CIM API 250 to create a volume in a target storage device, called:

"StorageConfigurationService. CreateOrModifyElementFromStoragePool( )"

This CIM API 250 has at least the following parameters:

ElementType: indicates type of storage element to be configured, e.g., volume.

Goal: indicates type of volume configuration, e.g., RAID level, etc.

Size: size of volume to create.

InPool: storage pool from which to create volume.

TheElement: used for return volume.

Path: identifier of target device in which to create volume.

Figure 7:
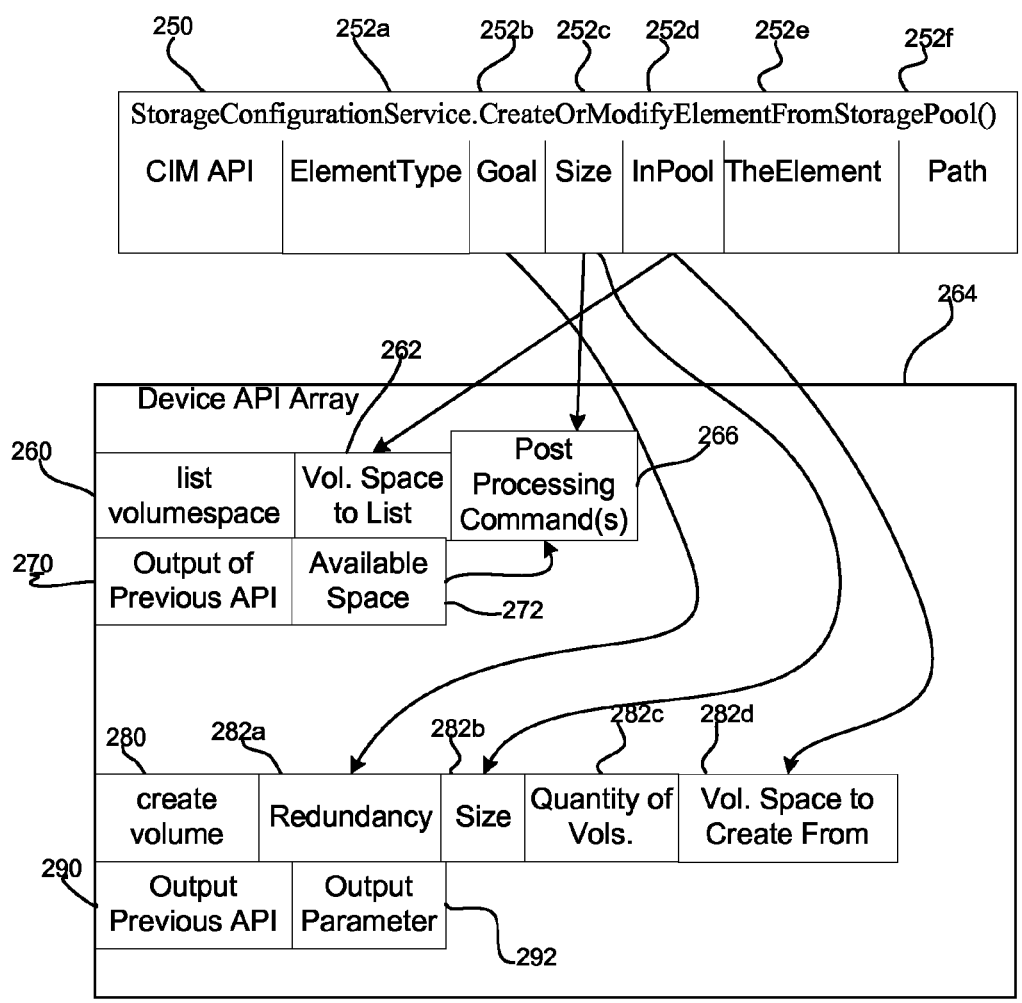

FIG. 7 illustrates how the parameters 252*a*, 252*b*, 252*c*, 252*d*, 252*e*, and 252 of the CIM API 250 map to input parameters 262*a*, 262 of a device API 260, named "list volumespace" that determines the available space in the target device. The device API 260 is contained within the device API array 264, including multiple device APIs 260, 280 to process. The InPool parameter 252*d* of the CIM API 250 maps to the volume space to list parameter 262 of the first device API 260, "list volumespace". The device API 260 "list volumespace" obtains information from the device concerning the available storage space. The post processing command 266 of the device API 260 would determine whether there is sufficient space to create the requested volume based on the available storage space returned in response to the "list volumespace" device API. The specified post processing operation 266 would compare the available storage space, provided by the "list volumespace" API 260, to the requested size of the volume to create as indicated in the size parameter 252c of the CIM API 250. If there is sufficient storage space, then the post processing operation 266 calls the next device API 280 "create volume" to execute within the target managed device 8a, 8b, 8c to create the volume. If there is not sufficient available storage space, then the post processing operation 266 returns an error response to the CIM request. The device API 280 "create volume" receives as input certain parameters 252b, 252c, and 252d of the CIM request 250 that map to input parameters 282a, 282b, and 282d of the device API 280 that provide the parameters used to create the volume in the one or more target storage devices. The output 290 of the device API 280 "create volume" would indicate whether the create volume operation was a success or failure, where such indication would be returned as part of the CIM response to the initial CIM API request 250.

The described implementations provide an architecture for implementing the mappings within a CIM provider. The developer of the architecture described herein would provide device vendors a CIM provider development tool, including various methods, to allow the device vendor to populate the data dictionary and the CIM API mapping 32. In this way, the device vendor could reuse a CIM API mapping 32 by modifying, adding or deleting entries from a previously generated CIM API mapping 32 for a related device. Once the mapping is provided, the CIM provider will automatically implement the mapping specified in the CIM API mapping 32 in a CIM runtime environment. Further, the device mapping 30 can be modified when the CIM provider is deployed in a network 10 by a network administrator or automatically as new managed devices register with a CIM provider 6a, 6b to be managed by such CIM provider.

Additional Implementation Details

The described techniques for mapping commands may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations concern mapping CIM APIs to device specific APIs. In alternative implementations, the mapping techniques described herein may apply to any environment where device independent APIs, that are not tied to a specific device, need to be translated to device specific APIs to execute on a particular device.

The described implementations provided a mapping of commands in a device independent format, such as CIM, to commands in a device dependent format capable of executing on a target device. In alternative implementations, the first type and second type of commands for which the mapping is provided may comprise types of commands other than a device independent command type and device dependent command type.

In the described implementations, CIM APIs and parameters were mapped to entries in device APIs and parameters. In further implementations, an entry in the CIM API mapping 32 may indicate certain ranges of values for the CIM API parameters, such that a CIM API only maps to the corresponding device API in the entry if the received CIM API parameter values falls within the range of CIM API parameter values specified in the entry, thereby allowing a CIM API to map to different device APIs or a same device API with different parameter values depending on the parameter values of the received CIM API.

In the described implementations, the device mapping 30 was described as having entries, where each entry 40 provided an association of a device name 42 or device identifier to a network address 44 of the device associated with the identifier 44. Further, the CIM API mapping 32 was described as having entries, where each entry providing a mapping of a CIM API to one or more device specific APIs. In alternative implementations, the device name 30 and CIM API 32 mappings may be implemented in ways other than having an entry for each specific mapping and association. For instance, the mapping and association information may be included in separate files or data structures.

FIGS. 3, 4, 5, and 7 illustrate an arrangement of the information to associate device names or device identifiers with network addresses and CIM APIs with device specific APIs. Those skilled in the art will appreciate that the information described with respect to FIGS. 3, 4, and 5 may be organized and stored in many different formats, including, but not limited to, the format of the information described with respect to FIGS. 3, 4, and 5. Further, additional information may also be provided with the metadata.

The illustrated logic of FIG. 6 shows certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

In the described implementations, the post processing operation either altered output received from an executed device API before providing the output to the input of one or more subsequent device APIs or performed a check operation on the output of one device API to determine whether to proceed to process subsequent device APIs in the device array. The post processing command may perform additional types of operations, such as additional checking or processing related to implementing the CIM request from the CIM application.

Figure 8:
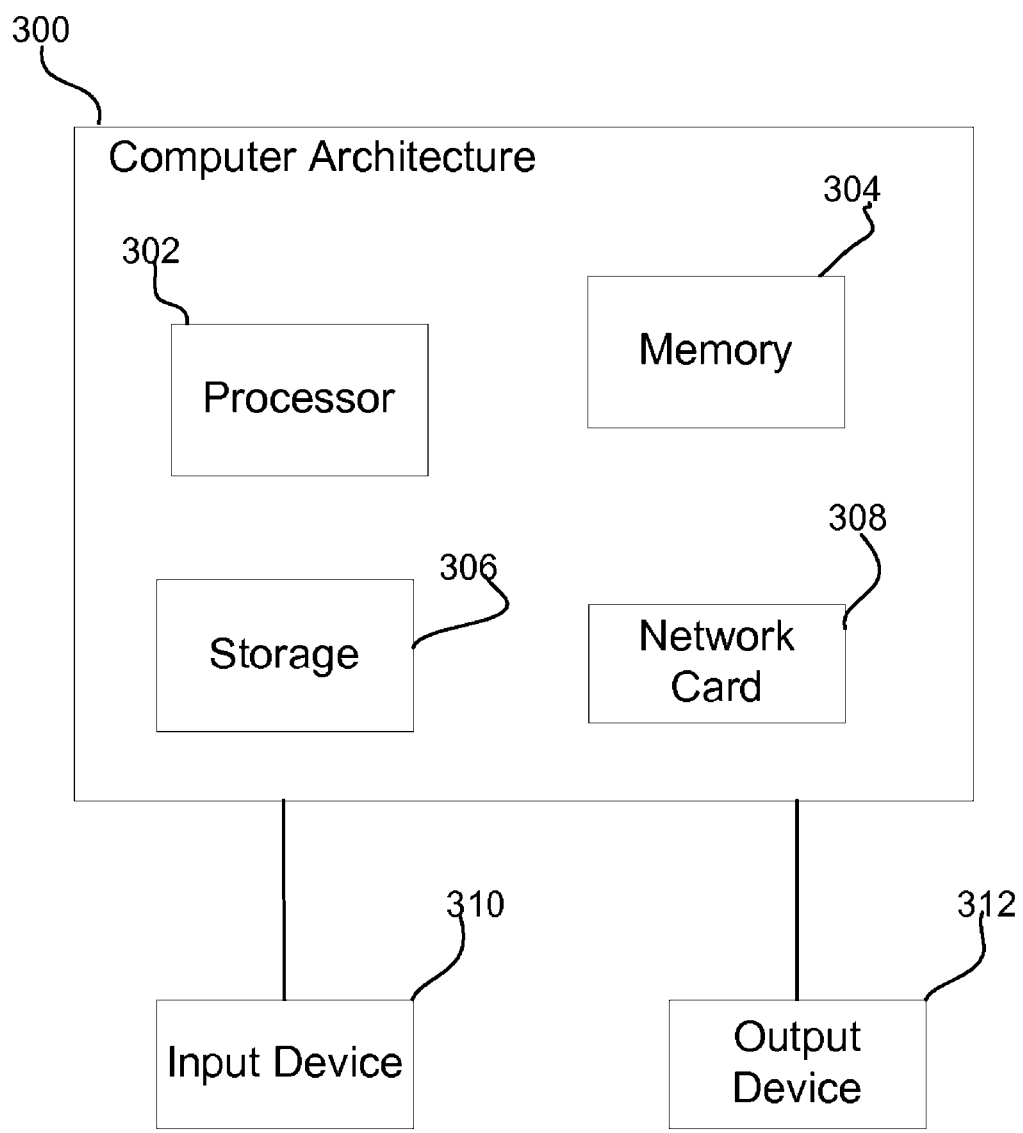
FIG. 8 illustrates an architecture of computing components in the network environment of FIG. 1.

FIG. 8 illustrates one implementation of a computer architecture 300 of the network components, such as the hosts 2a, 2b . . . 2n, managed devices 8a, 8b . . . 8n, and any other systems including the CIMOM 4 and CIM Provider 6a, 6b shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture for managing devices in a network, wherein the article of manufacture causes operations to be performed, the operations comprising:
  receiving a device independent command to perform device management operations with respect to at least one device in the network, wherein the received command is capable of being directed to at least one of a plurality of devices in the network;
  determining from a first mapping a network address of the device to which the received command is directed;
  determining from a second mapping at least one device specific command associated with the received device independent command, wherein the mapping indicates a mapping of at least one parameter included in the received device independent command to at least one parameter in the associated device specific command;
  generating the determined at least one device specific command to include as parameters the at least one parameter from the device independent command indicated in the second mapping; and
  transmitting the generated at least one device specific command to the device at the determined network address, wherein the device identified by the determined network address executes the at least one device specific command.

2. The article of manufacture of claim 1, further comprising:
  receiving output related to the at least one transmitted device specific command, wherein the transmitted at least one device specific command comprises an at least one previously executed command;
  determining whether the second mapping indicates an additional device specific command associated with the received device independent command that follows the at least one previously executed command; and
  generating the additional device specific command to the determined network address if the second mapping indicates the additional device specific command.

3. The article of manufacture of claim 2, wherein generating the additional device specific command further comprises:
  determining from the second mapping a mapping of the received output to at least one parameter of the additional device specific command, wherein at least one parameter included in the generated additional device specific command includes the received output that maps to the at least one parameter of the previously executed command.

4. The article of manufacture of claim 3, wherein the second mapping further indicates data not included in the received output that maps to at least one parameter of the generated additional device specific command.

5. The article of manufacture of claim 4, wherein the data not included in the received output that is capable of mapping to the at least one parameter of the generated additional device specific command comprises at least one parameter of the received device independent command.

6. The article of manufacture of claim 3, further comprising:
  determining whether a post-processing operation is associated with the previously executed command; and
  performing the post-processing operation on output returned in response to executing the previously executed command to generate transformed output if such post-processing operation is associated, wherein at least one parameter in the generated additional device specific command that includes output includes transformed output.

7. The article of manufacture of claim 2, further comprising:
  transmitting the generated additional device specific command to the determined network address if the second mapping indicates the additional device specific command; and
  returning the output to an initiator of the received device independent command if the second mapping does not indicate one additional device specific command following the previously executed command whose execution generated the received output.

8. The article of manufacture of claim 7, wherein the output includes output parameters, and wherein the second mapping is capable of indicating that at least one of the output parameters maps to at least one of the parameters of the additional device specific command.

9. The article of manufacture of claim 2, further comprising:
  processing the output related to the previously executed command to determine whether to execute an additional device specific command, wherein the steps of determining whether the second mapping indicates the additional device specific command and generating the additional device specific command are only performed if the determination is made to execute the additional device specific command in response to processing the output.

10. The article of manufacture of claim 1, wherein the device independent command comprises a command that is part of an object oriented management schema for managing non-homogeneous devices in a network environment.

11. The article of manufacture of claim 10, wherein the management schema comprises the Common Information Model (CIM).

12. The article of manufacture of claim 1, further comprising:
   determining whether a post-processing operation is associated with the determined device specific command;
   performing the post-processing operation on output returned in response to executing the generated device specific command to generate transformed output if such post-processing operation is associated; and
   returning the transformed output to an initiator of the received device specific command.

13. The article of manufacture of claim 1, wherein the second mapping is capable of mapping one device independent command to different device specific commands, wherein a value of the parameters in the received device independent command determines the at least one associated device specific command.

14. The article of manufacture of claim 1, wherein determining from the first mapping the network address comprises determining a plurality of network addresses to which the received device independent command is directed, and wherein transmitting the generated at least one device specific command comprises transmitting the generated at least one device specific command to the determined plurality of network addresses.

15. A system for managing devices in a network, comprising:
   at least one network device;
   a program executed to perform operations comprising:
      receiving a device independent command to perform device management operations with respect to at least one device in the network, wherein the received command is capable of being directed to at least one of a plurality of devices in the network;
      determining from a first mapping a network address of the device to which the received device independent command is directed;
      determining from a second mapping at least one device specific command associated with the received command, wherein the mapping indicates a mapping of at least one parameter included in the received device independent command to at least one parameter in the associated at least one device specific command;
      generating the determined at least one device specific command to include as parameters the at least one parameter from the device independent command indicated in the second mapping; and
      transmitting the generated at least one device specific command to the determined network address, wherein the device identified by the determined network address executes the at least one device specific command.

16. The system of claim 15, wherein the program is executed to further perform:
   receiving output related to the transmitted at least one device specific command, wherein the transmitted at least one device specific command comprises an at least one previously executed command;
   determining whether the second mapping indicates an additional device specific command associated with the received device independent command that follows the at least one previously executed command; and
   generating the additional device specific command to the determined network address if the second mapping indicates the additional device specific command.

17. The system of claim 16, wherein generating the additional device specific command further comprises:
   determining from the second mapping a mapping of the received output to at least one parameter of the additional device specific command, wherein at least one parameter included in the generated additional device specific command includes the received output that maps to the at least one parameter of the previously executed command.

18. The system of claim 17, wherein the second mapping further indicates data not included in the received output that maps to at least one parameter of the generated additional device specific command.

19. The system of claim 18, wherein the data not included in the received output that is capable of mapping to the at least one parameter of the generated additional device specific command comprises at least one parameter of the received device independent command.

20. The system of claim 17, wherein the output includes output parameters, and wherein the second mapping is capable of indicating that at least one of the output parameters maps to at least one of the parameters of the additional device specific command.

21. The system of claim 17, wherein the program is executed to further perform:
   determining whether a post-processing operation is associated with the previously executed command; and
   performing the post-processing operation on output returned in response to executing the previously executed command to generate transformed output if such post-processing operation is associated, wherein at least one parameter in the generated additional device specific command that includes output includes transformed output.

22. The system of claim 16, wherein the program is executed to further perform:
   transmitting the generated additional device specific command to the determined network address if the second mapping indicates the additional device specific command; and
   returning the output to an initiator of the received device independent command if the second mapping does not indicate one additional device specific command following the previously executed command whose execution generated the received output.

23. The system of claim 16, wherein the program is executed to further perform:
   processing the output related to the previously executed command to determine whether to execute an additional device specific command, wherein the steps of determining whether the second mapping indicates the additional device specific command and generating the additional device specific command are only performed if the determination is made to execute the additional device specific command in response to processing the output.

24. The system of claim 15, wherein the device independent command comprises a command that is part of an object oriented management schema for managing non-homogeneous devices in a network environment.

25. The system of claim 24, wherein the management schema comprises the Common Information Model (CIM).

26. The system of claim 15, wherein the program is executed to further perform:
   determining whether a post-processing operation is associated with the determined device specific command;
   performing the post-processing operation on output returned in response to executing the generated device specific command to generate transformed output if such post-processing operation is associated; and
   returning the transformed output to an initiator of the received device specific command.

27. The system of claim 15, wherein the second mapping is capable of mapping one device independent command to different device specific commands, wherein a value of the parameters in the received device independent command determines the at least one associated device specific command.

28. The system of claim 15, wherein determining from the first mapping the network address comprises determining a plurality of network addresses to which the received device independent command is directed, and wherein transmitting the generated at least one device specific command comprises transmitting the generated command to the determined plurality of network addresses.

29. The system of claim 15, further comprising:
   a system capable of communicating with the network device over the network, wherein the program is implemented within the additional system.

30. The system of claim 15, wherein the program is implemented within the network device to which the received command is directed.

* * * * *